United States Patent [19]

Kaji et al.

[11] Patent Number: 4,743,519
[45] Date of Patent: May 10, 1988

[54] FUEL CELL ELECTRODE SUBSTRATE PROVIDED WITH PERIPHERAL SEALERS

[75] Inventors: Hisatsugu Kaji, Iwaki; Kuniyuki Saitoh, Abiko, both of Japan

[73] Assignee: Kureha Kagaku Kogyo Kabushiki Kaisha, Tokyo, Japan

[21] Appl. No.: 918,110

[22] Filed: Oct. 14, 1986

[30] Foreign Application Priority Data

Oct. 25, 1985 [JP] Japan .................................. 60-238683

[51] Int. Cl.$^4$ ............................................. H01M 4/96
[52] U.S. Cl. ......................................... 429/36; 429/38; 429/40; 429/35
[58] Field of Search ...................... 429/38, 39, 40, 34, 429/35, 36, 37

[56] References Cited

U.S. PATENT DOCUMENTS 4,522,895 6/1985 Shigeta et al. ...................... 429/34

FOREIGN PATENT DOCUMENTS 2128395A 4/1984 United Kingdom .
2157482A 10/1985 United Kingdom .

Primary Examiner—John F. Niebling
Assistant Examiner—Steven P. Marquis
Attorney, Agent, or Firm—Nixon & Vanderhye

[57] ABSTRACT

Disclosed herein are an electrode substrate provided with peripheral sealers for a fuel cell, comprising two porous and carbonaceous electrodes respectively provided with flow channels of the reactant gas, said electrodes being joined to the both surfaces of a separator via a flexible graphite sheet so that said flow channels in one of said electrodes are perpendicular to those in another said electrode and said separator having the extended part which extends beyond a periphery of said electrode which is parallel to said flow channels in said electrode and each peripheral sealer on the side of said electrode parallel to said flow channels therein, which comprises a gas impermeable and compact carbon material, said peripheral sealer being joined to said extended part of said separator via a flexible graphite sheet, the whole composite materials being formed into one body as carbon by calcination thereof under a reduced pressure and/or in an inert atmosphere, and a process for producing the electrode substrate for a fuel cell.

8 Claims, 1 Drawing Sheet

FUEL CELL ELECTRODE SUBSTRATE PROVIDED WITH PERIPHERAL SEALERS

BACKGROUND OF THE INVENTION

The present invention relates in general to an electrode substrate for a fuel cell of phosphoric acid type, and more in detail, relates to an electrode substrate provided with peripheral sealers for a fuel cell, comprising two porous and carbonaceous electrodes respectively provided with flow channels of the reactant gas, said electrodes being joined to the both surfaces of a separator via a flexible graphite sheet so that said flow channels in one of said electrodes are perpendicular to those in another said electrode and said separator having the extended part which extends beyond a periphery of said electrode which is parallel to said flow channels in said electrode and each peripheral sealer on the side of said electrode parallel to said flow channels therein, which comprises a gas impermeable and compact carbon material, said peripheral sealer being joined to said extended part of said separator via a flexible graphite sheet, the whole composite materials being formed into one body as carbon by calcination thereof under a reduced pressure and/or in an inert atmosphere, and a process for producing the electrode substrate.

In general, the substrates as the electrode in the fuel cell of a phosphoric acid type are stacked so that its one surface is contacted to the phosphoric acid matrix and its another surface is contacted to the separator. In addition, in order to make a fuel cell by stacking the electrode substrates, a seal material is disposed on the edge part thereof to prevent the leakage of the reactant gas from the side of the electrode substrate of the cell to outside.

In such a fuel cell, the joining between the composite materials of the fuel cell has hitherto been carried out by the use of carbon cement. Since carbon cement is eroded by phosphoric acid, there has been possibility of causing exfoliation of the composite materials and of leakage of the reactant gas through the joined parts.

Moreover, since the electrode substrate takes generally a thin-plate form, there has been a problem from the view point of mechanical strength, namely, the electrode substrate is broken in handling, particularly in the case where the surface area of the electrode substrate is large enough.

As a result of the present inventors' studies on the process for producing the electrode substrate for a fuel cell, which does not have the above-mentioned defects, it has been found by the present inventors that the electrode substrate provided with the peripheral sealers on the side of the electrode parallel to the flow channel therein, in which the separator, the electrode and the peripheral sealers have been joined together via flexible graphite sheet(s) and have been calcined into one body as carbon is particularly excellent in resistance to phosphoric acid and at the same time, since the peripheral sealers have been evenly disposed on and joined to the peripheral part of the substrate while holding the separator from both sides thereof in a crossed state and they are calcined to be one body as carbon, there is a reinforcing effect, and that the electrode substrate of the above-mentioned construction is excellent in handling property, and on the basis of their findings, the present inventors have attained the present invention.

The first object of the present invention is to provide an electrode substrate provided with peripheral sealers for a fuel cell, in which the peripheral sealers for the reactant gas have been joined to the separator and have been made into one body as carbon.

The second object of the present invention is to provide an electrode substrate excellent in resistance to phosphoric acid.

The other objects and the merits of the present invention will be clear to the persons skilled in the art from the following description.

SUMMARY OF THE INVENTION

In a first aspect of the present invention, there is provided an electrode substrate provided with peripheral sealers for a fuel cell, comprising two porous and carbonaceous electrodes respectively provided with flow channels of the reactant gas, said electrodes being joined to the both surfaces of a separator via a flexible graphite sheet so that said flow channels in one of said electrodes are perpendicular to those in another said electrode and said separator having the extended part which extends beyond a periphery of said electrode which is parallel to said flow channels in said electrode and each peripheral sealer on the side of said electrode parallel to said flow channels therein, which comprises a gas impermeable and compact carbon material, said peripheral sealer being joined to said extended part of said separator via a flexible graphite sheet, the whole composite materials being formed into one body as carbon by calcination thereof under a reduced pressure and/or in an inert atmosphere.

In a second aspect of the present invention, there is provided a process for producing an electrode substrate provided with peripheral sealers for a fuel cell, which process comprises the steps of:

(1) joining flexible graphite sheet(s) having the same length and width as those of a separator to each of the both surfaces of the separator by an adhesive, (2) applying said adhesive onto each of the joining surfaces of (a) two porous and carbonaceous electrode materials each of which is smaller in surface area than said separator and has been provided with flow channels of the reactant gas, (b) the thus joined flexible graphite sheet(s) and (c) peripheral sealer materials comprising a gas-impermeable and compact carbon material, (3) joining said two electrode materials to the both surfaces of said separator via said flexible graphite sheet so that said flow channels of the reactant gas in one of said electrode materials are perpendicular to those in the another electrode material, (4) disposing a pair of said peripheral sealer materials in contact with the periphery of said electrode material which is parallel to said flow channels of the reactant gas therein and joining each said peripheral sealer material to the each extended part of said separator material, which extends beyond the periphery of said electrode material, via said flexible graphite sheet(s) and (5) thereafter calcining the thus whole composite materials under a reduced pressure and/or in an inert atmosphere to form them into one body as carbon.

BRIEF EXPLANATION OF DRAWING

Of the attached drawing.

DETAILED DESCRIPTION OF THE INVENTION

Figure 1:
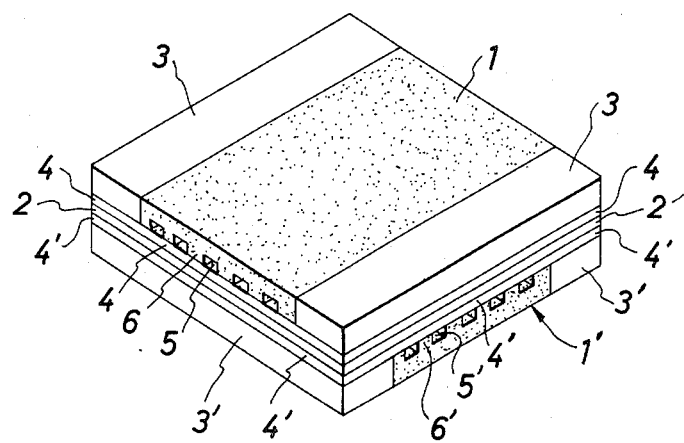
FIG. 1 is the oblique view of the electrode substrate according to the present invention.

The present invention relates to an electrode substrate provided with peripheral sealers for a fuel cell, comprising two porous and carbonaceous electrodes respectively provided with flow channels of the reactant gas, said electrodes being joined to the both surfaces of a separator via a flexible graphite sheet so that said flow channels in one of said electrodes are perpendicular to those in another said electrode and said separator having the extended part which extends beyond a periphery of said electrode which is parallel to said flow channels in said electrode and each peripheral sealer on the side of said electrode parallel to said flow channels therein, which comprises a gas impermeable and compact carbon material, said peripheral sealer being joined to said extended part of said separator via a flexible graphite sheet, the whole composite materials being formed into one body as carbon by calcination thereof under a reduced pressure and/or in an inert atmosphere, and to a process for producing the electrode substrate.

The electrode substrate according to the present invention will be explained more in detail while referring to the attached drawing as follows.

The attached drawing is a figure which shows the oblique view of the electrode substrate according to the present invention.

The electrode substrate according to the present invention has a construction comprising the two electrodes 1 and 1' having the flow channels 5 and 5' of a reactant gas and the ribs 6 and 6', the separator 2 which has been disposed between the two electrodes 1 and 1' and the peripheral sealers 3 and 3' which contact to the periphery of the electrode, which is parallel to the flow channels 5 and 5' of the abovementioned electrode.

The separator 2 is larger in a surface area than the electrodes 1 and 1' and as has been shown in the FIGURE, it extends beyond the periphery of the electrode, which is parallel to the flow channels 5 or 5' of one of the electrodes (the outer edge of the extended part coincides with the outer edge of the another electrode), and the peripheral sealers 3 and 3' have been joined to the extended part.

Between the separator 2 and each of the electrodes 1 and 1', flexible graphite sheets 4 and 4' have been interposed, and the peripheral (extended) part of the separator (beyond the electrodes 1 and 1') and each of the peripheral sealers 3 and 3' have been joined together respectively via each of the flexible graphite sheets 4 and 4'.

Further, the flexible graphite sheet 4 and 4' may be interposed between the separator 2 and the top surface of the ribs 6 and 6' only, although the thus construction is not shown in the FIGURE.

The electrode is made of a porous and carbonaceous material and after having been calcined at a temperature of not lower than 1000° C. under a reduced pressure and/or in an inert atmosphere, it is preferable that the electrode shows a mean bulk density of 0.3 to 0.9 g/cc, a gas-permeability of not less than 200 ml/cm$^2$·hour·mmAq and an electric resistance of not more than 200 mΩ·cm.

It is preferable that the separator shows a mean bulk density of not less than 1.4 g/cc, a gas-permeability of not more than $10^{-6}$ ml/cm$^2$·hour·mmAq and an electric resistance of not more than 10 mΩ·cm and a thickness of the separator is preferably not more than 2 mm.

It is preferable that the above-mentioned peripheral sealer shows a mean bulk density of not less than 1.4 g/cc and a gas-permeability of not more than $10^{-4}$ ml/cm$^2$·hour·mmAq.

As has been described, in the electrode substrate for fuel cell according to the present invention, all the peripheral sealers and the separator have been joined via the flexible graphite sheet(s), and the amount of gas-leakage to outside through the peripheral sealer including the thus joined parts depends mainly on diffusion and is not so much affected by the pressure, however, it is preferable that an amount of gas-leakage is not more than $10^{-2}$ ml/cm·hour·mmAq when an amount of gas-leakage per unit time per the peripheral length of the joined part under a differential pressure of 500 mmAq is represented by [amount of gas-leakage/(side length of the periphery)·(differential pressure)].

In order to produce the electrode substrate provided with the peripheral sealers for a fuel cell according to the present invention, the electrode material and the peripheral sealer material are joined to the separator material while interposing the flexible graphite sheet between them and applying an adhesive on each of joining surfaces thereof, and the whole composite materials thus joined are subjected to calcination.

The preferable process for producing the electrode substrate provided with the peripheral sealers for a fuel cell according to the present invention will be explained as follows.

In the first place, the two porous and carbonaceous electrode materials provided with the flow channels of the reactant gas are disposed on the both surfaces of the separator material so that the flow channels in one of the electrode materials are perpendicular to the flow channels in the another electrode material, and the electrode materials and the separator are joined together by an adhesive while interposing a flexible graphite sheet between (1) the ribbed surface of the electrode materials and (2) the separator material.

Further, a flexible graphite sheet is interposed between (1) the extended part of the separator which extends beyond the periphery parallel to the flow channels of the reactant gas in the electrode material and (2) the peripheral sealer material to be joined thereto, and the both materials are joined together by an adhesive.

As the electrode material of the electrode substrate according to the present invention, the following material is used:

(1) A material made by thermally molding a mixture of short carbon fibers, a binder and an organic granular substance under a pressure (refer to U.S. Pat. Nos. 4,522,895 and 4,580,337). Particularly, the material prepared by molding a mixture consisting of 20 to 60% by weight of short carbon fibers of not more than 2 mm in length, 20 to 50% by weight of a phenol resin and 20 to 50% by weight of an organic granular substance (a micro-pore regulator) at a molding temperature of 100° to 180° C., under a molding pressure of 2 to 100 kgf/cm$^2$G for one to 60 min.

(2) A material made by calcining the molded material of the above-mentioned (1) at a temperature of not lower than 1000° C. under a reduced pressure and/or in an inert atmosphere.

(3) A molded body comprising (a) gas diffusion part made of the resin-impregnated paper sheet obtained by impregnating a paper sheet obtained from a mixture of carbon fibers of not more than 20 mm in length, at least one kind of organic fibers selected from the group consisting of pulp, regenerated cellulose fibers, polyacrylonitrile fibers, etc. and a papermaking binder (polyvinyl alcohol fibers, etc.) by paper-manufacturing method with a solution of a phenol resin (for instance, refer to U.S. Pat. No. 3,998,689 and (b) the rib portion prepared by using the raw material of the above-mentioned (1).

(4) A material obtained by calcining the molded body of the above-mentioned (3) at a temperature of not lower than 1000° C. under a reduced pressure and/or in an inert atmosphere.

As the separator material used in producing the electrode substrate according to the present invention, a compact carbon plate of a calcining shrinkage of not more than 0.2% in the case of calcining it at 2000° C. under a reduced pressure and/or in an inert atmosphere is preferable.

The flexible graphite sheet prepared by compressing expanded graphite particles and used according to the present invention is prepared by compressing the expanded graphite particles obtained by subjecting graphite particles of not more than 5 mm in diameter to acid-treatment and further heating the thus treated graphite particles, and it is preferable that the flexible graphite sheet is not more than 1 mm in thickness, 1.0 to 1.5 g/cc in a bulk density, not more than $0.35 \times 10^{31\,2}$ cm$^2$/kgf in a rate of compression strain (namely, the rate of strain under the compression load of 1 kgf/cm$^2$) and has a flexibility of not being broken when being bent to 20 mm in the radius of curvature. As a favorable example of the flexible graphite sheet commercialized, GRAFOIL ® (made by U.C.C.) may be exemplified.

As the adhesive used on the joining surfaces when the above-mentioned electrode material and the peripheral sealer material are joined to the separator material via the flexible graphite sheet, the adhesive generally used for joining the ordinary carbon materials together may be mentioned, however, particularly it is preferable to use a thermosetting resin selected from phenol resins, epoxy resins and furan resins for that purpose.

Although the thickness of the layer of the adhesive is not particularly restricted, it is preferable to apply the adhesive uniformly in a thickness of not more than 0.5 mm.

Furthermore, the joining by the above-mentioned adhesive can be carried out under the conditions of a pressing temperature of 100° to 180° C., a pressure of 1.5 to 50 kgf/cm$^2$G and a pressure holding time of 1 to 120 min.

As the peripheral sealer material, a compact carbon material which shows the calcining shrinkage of not more than 0.2% when it is calcined at 2000° C. under a reduced pressure and/or in an inert atmosphere is preferably used.

Thereafter, the thus obtained joined materials are after-hardend by heating at the pressing temperature for at least 2 hours, and then calcined at a temperature of 800° to 3000° C. for about one hour under a reduced pressure and/or in an inert atmosphere.

Since, in the electrode substrate provided with the peripheral sealers for a fuel cell according to the present invention, the peripheral sealers have been formed by joining to the substrate in one body, it is not necessary, of course, to provide a special peripheral sealer which is considered necessary in the ordinary fuel cell for preventing the leakage of reactant gas to the side of the cell, and at the same time, the following effect is also exhibited.

Namely, since the electrodes, the peripheral sealers and the separator have been joined together into one body via the flexible graphite sheet(s), the electrode substrate according to the present invention is excellent in the resistance to phosphoric acid, and is particularly useful as an electrode substrate for a fuel cell of a phosphoric acid type. In addition, since the peripheral sealers have been evenly disposed on and joined to the electrode substrate of thin-plate-form while holding the separator from both sides thereof in a crossed state, there is a reinforcing effect due to the above-mentioned structure, and as a result, the electrode substrate according to the present invention is excellent in handling property in the case of producing the fuel cell.

Besides, since in the electrode substrate provided with the peripheral sealers for a fuel cell according to the present invention, the flexible graphite sheet acts as the buffering material of thermal expansion and shrinkage of the electrode material and the peripheral sealer material at the time of heat-treatment, there are no occasion of exfoliation on the joining surfaces of the raw materials, and there are no occasion of cracks in the product.

Namely, it is possible to produce the electrode substrate in a favorable production yield. Such an effect of the present invention is made clear when the effect is compared to that in the case of using particularly, the adhesive only.

In addition, in the present invention, it is possible to produce a product of large size, for instance, with the longest side of not smaller than about 100 cm, without causing the problem of exfoliation, cracks, etc.

The present invention will be explained more in detail while referring to the non-limitative Example as follows.

EXAMPLE

(1) Electrode material

After mixing 35% by weight of short carbon fibers (made by KUREHA KAGAKU KOGYO Co., Ltd., under the trade name of M-204S, mean diameter of 14 μm and mean length of 400 μm), 30% by weight of a phenol resin (made by ASAHI YUKIZAI Co., Ltd., under the trade name of RM-210) and 35% by weight of polyvinyl alcohol particles (made by NIHON GOSEI KAGAKU KOGYO Co., Ltd. mean diameter of 180 μm), the mixture was supplied into a prescribed metal mold and molded into a ribbed electrode material of 600 mm in length, 720 mm in width and 1.5 mm in thickness under the conditions of the molding temperature of 135° C., the molding pressure of 35 kgf/cm$^2$ G and the pressure holding time of 20 min. The thickness of the rib and the thickness of the gas-diffusion part of the product were 1.0 mm and 0.5 mm, respectively.

(2) Separator material

A compact and carbon plate (made by SHOWA DENKO Co., Ltd. thickness of 0.8 mm) was cut into a piece of 720 mm in length and in width, respectively to be the separator material.

(3) Peripheral sealer material

A compact and carbon plate (made by TOKAI Carbon Co., Ltd. of a bulk density of 1.85 g/cc and a thickness of 1.5 mm) was cut into 4 pieces of 60 mm in length and 720 mm in width to be the peripheral sealer materials.

(4) Flexible graphite sheet

A GRAFOIL ® (made by U.C.C., of a bulk density of 1.10 g/cc and thickness of 0.13 mm) was cut into two pieces in the same length and width as those of the separator material.

After applying an adhesive of phenol resin series on both the surfaces of the separator material and one surface of each GRAFOIL ®, the thus applied adhesive was dried and the separator and the flexible graphite sheet (GRAFOIL ®) were joined together under the conditions of 135° C., 10 kgf/cm²G and 20 min.

In the next step, the above-mentioned adhesive was applied on each of the GRAFOIL ® surfaces of the thus joined materials and the thus applied adhesive was dried. In the same manner, the above-mentioned adhesive was applied on the top surface of the rib of the electrode material and the joining surface of the peripheral sealer material and the thus applied adhesive was dried.

Thereafter, each of the thus treated materials was supplied into a mold so that they form a predetermined shape. Namely, each of the two electrode materials is disposed on each of the both surfaces of the separator material so that the flow channels in one of the electrode materials are perpendicular to the flow channels in the another electrode material and the abovementioned each peripheral sealer material is disposed while facing to the extended part of the separator, which extends beyond the periphery of the electrode material parallel to the flow channels therein. And the thus supplied materials were joined together under the conditions of 135° C., 10 kgf/cm²G and 20 min, and further calcined at 2000° C. in a nitrogen atmosphere to obtain an electrode substrate provided with the peripheral sealers for a fuel cell, which had been made into one body as carbon.

What is claimed is:

1. An electrode substrate provided with peripheral sealers for a fuel cell, comprising
    two porous and carbonaceous electrodes respectively provided with flow channels of the reactant gas, said electrodes being joined to the both surfaces of a separator via a flexible graphite sheet so that said flow channels in one of said electrodes are perpendicular to those in another said electrode and said separator having the extended part which extends beyond a periphery of said electrode which is parallel to said flow channels in said electrode and
    each peripheral sealer on the side of said electrode parallel to said flow channels therein, which comprises a gas impermeable and compact carbon material, said peripheral sealer being joined to said extended part of said separator via a flexible graphite sheet,
    the whole composite materials being formed into one body of carbon by calcination thereof under a reduced pressure and/or in an inert atmosphere or both.

2. An electrode substrate provided with peripheral sealers for a fuel cell according to claim 1, wherein said porous and carbonaceous electrode has a bulk density of 0.3 to 0.9 g/cc, a gas-permeability of not less than 200 ml/cm²·hour·mmAq and an electric resistance of not more than 200 mΩ·cm.

3. An electrode substrate provided with peripheral sealers for a fuel cell according to claim 1, wherein said separator has a bulk density of not less than 1.4 g/cc, a gas-permeability of not more than $10^{-6}$ ml/cm²·hour·mmAq, an electric resistance of not more than 10 mΩ·cm and a thickness of not more than 2 mm.

4. An electrode substrate provided with peripheral sealers for a fuel cell according to claim 1, wherein said peripheral sealer has a bulk density of not less than 1.4 g/cc and a gas-permeability of not more than $10^{-4}$ ml/cm²·hour·mmAq.

5. An electrode substrate provided with peripheral sealers for a fuel cell according to claim 1, wherein said flexible graphite sheet has been produced by compressing expanded graphite particles.

6. An electrode substrate provided with peripheral sealers for a fuel cell according to claim 5, wherein said flexible graphite sheet has been produced by compressing expanded graphite particles obtained by subjecting graphite particles of not more than 5 mm in diameter to acid-treatment and further heating the thus acid-treated graphite particles, and has a thickness of not more than 1 mm, a bulk density of 1.0 to 1.5 g/cc, a rate of compression strain of not more than $0.35 \times 10^{-2}$ cm²/kgf and a flexibility of not being broken when being bent to the radius of curvature of 20 mm.

7. A fuel cell electrode substrate comprising:
    a first porous, carbonaceous electrode defining a first reactant gas flow passage therethrough and also defining a side edge parallel to said first flow passage;
    a second porous, carbonaceous electrode defining a second reactant gas flow passage therethrough and also defining a side edge parallel to said second passage;
    a separator having first and second opposing surfaces;
    a first peripheral sealing element abutting said first electrode side edge and comprising a gas impermeable and compact electrically conductive carbon material;
    a second peripheral sealing element abutting said second electrode side edge and comprising a gas impermeable and compact electrically conductive carbon material;
    first buffering/joining means disposed on said separator first surface for joining said first electrode and said first sealing element to said separator first surface and for buffering forces generated by thermal expansion/contraction of said first electrode and first sealing element, said first buffering/joining means including a flexible, compressible graphite sheet; and
    second buffering/joining means disposed on said separator second surface for joining said second electrode and said second sealing element to said separator second surface such that said first and second passages are mutually perpendicular and for buffering forces generated by thermal expansion/contraction of said second electrode and second sealing element said second buffering/joining means including a flexible, compressible graphite sheet,
    wherein said first and second electrodes, said separator, said first and second sealing elements, and said first and second buffering/joining means are formed into a unitary carbonized body by calcination under a reduced pressure, or in an inert atmosphere or both.

8. A fuel cell electrode substrate including:

a porous carbonaceous electrode defining plural parallel reactant gas flow passages therethrough and also defining a side edge surface parallel to said flow passages;

a peripheral sealing element abutting said electrode side edge surface, said sealing element comprising a gas impermeable and compact electrically-conductive solid carbon material having no passages defined therethrough;

a separator element; and buffering/joining means, disposed between said electrode and said separator element and between said sealing and separator elements, for joining said electrode and said peripheral sealing element to said separator element and for buffering forces produced by said electrode or said peripheral sealing element or both due to thermal expansion/contraction, said buffering/joining means including a flexible, compressible graphite sheet, wherein said electrode, said sealing element, said separator element and said buffering/joining means are formed into a unitary carbonized body by calcination under a reduced pressure or in an inert atmosphere or both.

* * * * *